(12) United States Patent
Qian

(10) Patent No.: US 12,432,653 B2
(45) Date of Patent: Sep. 30, 2025

(54) METHOD OF ON-BOARDING A MONITORING DEVICE INTO A NETWORKED ELECTRONIC MONITORING SYSTEM

(71) Applicant: Arlo Technologies, Inc., Carlsbad, CA (US)

(72) Inventor: Nanjian Qian, San Diego, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 289 days.

(21) Appl. No.: 17/956,233

(22) Filed: Sep. 29, 2022

(65) Prior Publication Data

US 2023/0101682 A1 Mar. 30, 2023

Related U.S. Application Data

(60) Provisional application No. 63/250,610, filed on Sep. 30, 2021.

(51) Int. Cl.
*H04W 48/20* (2009.01)
*G06K 7/14* (2006.01)
*H04W 84/12* (2009.01)

(52) U.S. Cl.
CPC .......... *H04W 48/20* (2013.01); *G06K 7/1417* (2013.01); *H04W 84/12* (2013.01)

(58) Field of Classification Search
CPC ..... H04W 12/08; H04W 48/20; H04W 84/12; H04W 12/50; H04W 12/77; H04W 12/35; H04B 17/318; A61B 5/00; G06K 7/1417; G08B 13/19695

USPC .......... 455/435.1; 370/252; 381/57
See application file for complete search history.

(56) References Cited

U.S. PATENT DOCUMENTS

| | | | |
|---|---|---|---|
| 8,787,188 B1 * | 7/2014 | Shmidt | H04W 88/08 370/252 |
| 10,594,990 B1 | 3/2020 | Lemberger et al. | |
| 2015/0245281 A1 | 8/2015 | Beguin et al. | |
| 2017/0228687 A1 * | 8/2017 | Stephen | G06Q 10/0833 |
| 2020/0204974 A1 * | 6/2020 | Strater | H04B 17/318 |
| 2021/0297875 A1 * | 9/2021 | Ergen | H04L 41/16 |
| 2022/0353683 A1 * | 11/2022 | Patil | H04W 12/50 |

OTHER PUBLICATIONS

Brecht, Benedikt, et al. "A security credential management system for V2X communications." IEEE Transactions on Intelligent Transportation Systems 19.12 (2018): 3850-3871. (Year: 2018).*

* cited by examiner

*Primary Examiner* — Sharad Rampuria
(74) *Attorney, Agent, or Firm* — Boyle Fredrickson, S.C.

(57) ABSTRACT

A method is provided for on-boarding/integrating a monitoring device, such as a smart camera, into an electronic monitoring system. A plurality of access points to a wireless network are displayed on a user device such as a smartphone. Each of the plurality of access points has a corresponding credential associated therewith. Some or all of the plurality of access points are selected. A computer-readable code including information for the selected access points and associated credentials is generated. The monitoring device reads the computer-readable code to obtain the information for the selected access points and associated credentials. Access points may be prioritized for connection to the wireless network based on signal strength.

12 Claims, 5 Drawing Sheets

METHOD OF ON-BOARDING A MONITORING DEVICE INTO A NETWORKED ELECTRONIC MONITORING SYSTEM

CROSS-REFERENCE TO A RELATED APPLICATION

This application claims the benefit of provisional patent application U.S. App. No. 63/250,610 filed on Sep. 30, 2021 and entitled "Method of On-Boarding a Monitoring Device into a Networked Electronic Monitoring System", the entire contents of which are hereby expressly incorporated by reference into the present application.

BACKGROUND OF THE INVENTION

1. Field of the Invention

The present invention relates generally to networked electronic monitoring systems and methods and, in particular, to a system and method for on-boarding/integrating a monitoring device into an electronic monitoring system.

2. Background of the Invention

Modern electronic monitoring systems for the home typically include imaging devices having one or more cameras having video and audio communication technology. Such imaging devices may comprise, for example, standalone smart cameras or doorbells having such cameras. Each imaging device can have one or more sensors, such as a motion sensor, directed at an activity zone to be monitored such that motion, or another monitored activity in the activity zone, triggers image capture and transmission by the imaging device's camera. The electronic monitoring system may also have additional monitoring devices that perform monitoring functions without capturing an image, such as standalone motion sensors, smoke detectors, etc. The electronic monitoring system further includes a hub or base station to communicate with the monitoring devices and with an external server, such as a cloud-based server. In addition, the hub or base station may also communicate with one or more user devices such as a desktop computer, a laptop computer, a smartphone, or a tablet.

In order to on-board or integrate the monitoring device into an electronic monitoring system, the one or more user devices may be used. For example, a user may log into an account on a predetermined website or open an application on a mobile user device and log into the account. Once logged into the account, a user may choose to add a monitoring device to the electronic monitoring system and select the specific type of monitoring device to be added, such as a camera, a doorbell, or a smoke detector. Thereafter, a user selects the type of connection, e.g., wireless network, through which the monitoring device is to be connected to the electronic monitoring system. The selected monitoring device is powered up, and the user device displays one or more access points or service set identifiers (SSIDs) for various available WIFI signals generated by a gateway router of the electronic monitoring system. The user selects a desired one of the one or more SSIDs displayed on the user device and inputs the WIFI credential associated with the selected SSID. In response, the user device generates a Quick Response (QR) code associated with SSID selected by the user, which includes data corresponding to the selected SSID and its associated WIFI credential. With the QR code displayed by the user device, a user engages a synchronization actuator on the monitoring device, thereby causing the camera of the monitoring device to scan the QR code. Using the data corresponding to the selected SSID and its associated WIFI credential, the monitoring device connects to an access point for the wireless network of the electronic monitoring system in a conventional manner.

While functional for their intended purpose, prior methods to on-board or integrate a monitoring device into an electronic monitoring system have certain limitations. By way of example, utilizing these prior methods, a user can only provide data for a single SSID and its associated WIFI credential to the monitoring device. In such circumstances, if the wireless network goes down, the monitoring device will no longer be able to communicate on the wireless network. Further, if the SSID used by the monitoring device to connect to the wireless network is not the best candidate for the monitoring device to perform the on-boarding process (for example, due to the distance between the monitoring device and the SSID and/or interference), the monitoring device may not be able to connect to the wireless network.

Further, in prior methods, a monitoring device would connect to the wireless network via a single SSID and its associated WIFI credential. As such, if a user would like to connect to the wireless network via a different SSID and its associated WIFI credential, the user must repeat the on-boarding process heretofore described and select a different SSID when prompted by the user device. It can be appreciated that, at best, repeating the on-boarding process is a nuisance. At worst, a serious problem may result if the monitoring device is unable to connect to the wireless network.

In view of the foregoing, a method is needed for on-boarding/integrating a monitoring device into an electronic monitoring system in which the monitoring device may simply and easily receive and store a plurality of SSIDs and WIFI credentials for connection to a wireless network.

Also needed is a method for on-boarding/integrating a monitoring device into an electronic monitoring system wherein the monitoring device is connectable to a wireless network via one of a plurality of SSIDs and WIFI credentials.

There is also a need for a method for on-boarding/integrating a monitoring device into an electronic monitoring system wherein a plurality of SSIDs and WIFI credentials may be simply and easily transferred to the monitoring device via a single QR code.

SUMMARY OF THE INVENTION

In accordance with an aspect the present invention, one or more of these needs is met by providing a method for on-boarding/integrating a monitoring device into an electronic monitoring system. A plurality of access points to a wireless network are displayed. Each of the plurality of access points has a corresponding credential associated therewith. Some or all of the plurality of access points are selected. A computer-readable code, including information for the selected access points and associated credentials, is generated. Thereafter, the computer-readable code is read with the monitoring device.

The method may include storing the information for the selected access points and associated credentials in computer-readable memory on the monitoring device. The selected access point having the greatest signal strength is the identified. Thereafter, the monitoring device is connected to the wireless network via the identified access point using the credential associated with the identified access point.

In the event of failure of the connection between the monitoring device and the wireless network via the identified access point, a second of the selected multiple access points is identified, and the monitoring device is connected to the wireless network via the identified second access point using the credential associated with the identified second access point.

The monitoring device may include an imaging device including a camera. The camera is configured to scan the computer-readable code, e.g., a QR code. The plurality of access points can be displayed on a user device, and the user device can display the computer-readable code to be read by the monitoring device.

A series of access points may be sequentially selected from the plurality of access points.

In accordance with another aspect of the present invention, a method is provided for on-boarding/integrating a monitoring device into an electronic monitoring system. The method includes displaying a list of a plurality of access points to a wireless network on a display associated with a user device. Each of the plurality of access points has a corresponding credential associated therewith. A series of access points is sequentially selected from the plurality of access points. A computer-readable code including data corresponding to the selected access points and associated credentials is displayed on the display associated with the user device. The computer-readable code is scanned with the monitoring device, and the data for the selected access points and associated credentials is stored in computer-readable memory on the monitoring device. The access point of the selected access points having the greatest signal strength is identified as an initial access point. The monitoring device is connected to the wireless network via the initial access point and the credential associated therewith.

In the event of failure of the connection between the monitoring device and the wireless network via the initial access point, a second access point of the selected access points having the greatest signal strength besides the initial access point is identified. Thereafter, the monitoring device is connected to the wireless network via the second access point and the credential associated therewith.

The monitoring device may include a camera configured to scan a computer-readable code, e.g., a QR code.

In accordance with still another aspect of the invention, a wireless network is provided that includes a monitoring device such as smart camera, a base station in wireless communication with the monitoring device and with a wide area network (WAN) that includes a user device, and a processor that is contained at least in part in the monitoring device. The process is configured to cause a plurality of access points to the wireless network to be displayed on the user device, each of the plurality of access points having a corresponding credential associated therewith. The wireless network is configured to permit the selection of some or all of the plurality of access points and to generate a computer-readable code that includes information for the selected access points and associated credentials. The computer-readable code then is read by the monitoring device.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
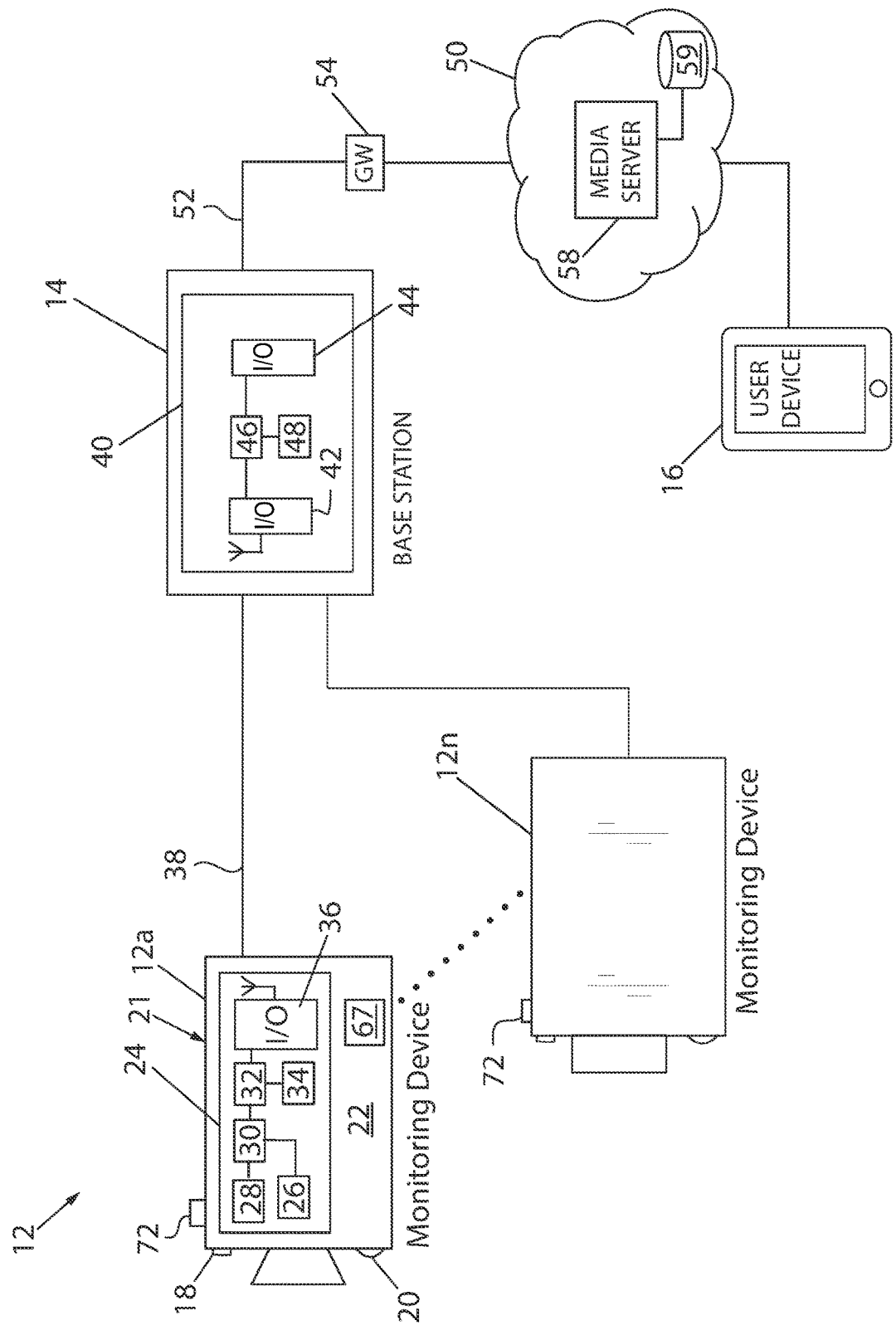
FIG. 1 is a schematic representation of an electronic monitoring system according to aspects of the invention.

Referring now to FIG. 1, in accordance with an aspect of the invention, an electronic system 10 for real-time monitoring can include one or more monitoring devices 12 and a hub or base station 14. A number "n" 12a-12n of monitoring devices are schematically illustrated in FIG. 1. Unless otherwise specified, all references to an "imaging device" 12 should be construed to apply equally to any of the imaging devices 12a-12n. One or more user devices 16, such as a smart phone, tablet, laptop, or PC, communicate with the base station 14. Each user device 16 includes a display that typically includes both an audio display and a video display, internal computing and storage capabilities, and a program or application servicing as a user interface for the system 10. In the case of a smart phone, the display typically will include a touch screen and a speaker.

Each monitoring device 12 is configured to perform any of a variety of monitoring, sensing, and communicating functions, including acquiring data and to transmitting it to the base station 14 for further processing and/or transmission to a server and/or the user device(s) 16. Each monitoring device 12 may be battery powered or wired. Several such monitoring devices may be mounted around a building or other structure or area being monitored. For example, in the case of a residential home, monitoring devices 12 could be mounted by each entrance, selected windows, and even on a gate or light pole. A monitoring device 12 also could be incorporated into or coupled to a doorbell, floodlight, etc. The monitoring devices 12 may comprise any combination of devices capable of monitoring a designated area such as a home, office, industrial or commercial building, yard, parking or storage lot, etc. Each individual monitoring device 12 may monitor one or a combination of parameters such as motion, sound, temperature etc. Each of the individual monitoring devices 12 may be or include still or video cameras, temperature sensors, microphones, motion sensors, etc. At least one such monitoring device, one of which is shown at shown at 12a in FIG. 1, is an imaging device described in more detail below. The data acquired by imaging device 12a typically will correspond to a video image, and each imaging device 12a may be or include a camera such as a video camera 21.

Still referring to FIG. 1, as labeled on imaging device 12a, one or more of the imaging device may include microphone 18, visible and/or infrared (IR) lights 20, a power supply 22 such as a battery or battery pack, and/or imaging device electronic circuitry 24. Circuit 24 may include one or more imagers 26, an audio circuit 28, a media encoder 30, a processor 32, a non-transient memory storage 34 and/or a wireless I/O communication device (radio) 36, among other things.

Still referring to FIG. 1, each monitoring device 12 can communicate with the base station 14 through a network 38. It is contemplated that the network 38 may be in whole or in part a wired network, a wireless network, or a combination thereof. The network 38 may include a private Wireless Local Area Network (WLAN) 38, hosted by the base station 14 operating as an access point. One such network is an IEEE 802.11 network. The hub or base station 14 can include base station electronic circuitry 40 including a first wireless I/O communication device 42 for communicating with the monitoring devices 12 over the WLAN 38, a second wired or wireless I/O communication device 44 for accessing a Wide Area Network (WAN) 50, such as the Internet through a Local Area Network (WLAN) 58 connected to a Gateway and/or Router 54, a processor 46 and/or a non-transient memory storage 48, among other things. The base station 14 also could be combined with a router 54 or another device in a single module, which would still be considered a "base station" within the meaning of the present disclosure. It should be apparent that "circuitry" in the regard can comprise hardware, firmware, software, or any combination thereof.

Instead of or in addition to containing a video camera 21 or other imaging device, one or all of the monitoring devices 12 may include one or more sensors 55 configured to detect one or more types of conditions or stimulus, for example, motion, opening or closing events of doors or windows, sounds such as breaking glass or gunshots, the presence of smoke, carbon monoxide, water leaks, and temperature changes. The monitoring devices 12 may further include or be other devices such as audio devices, including microphones, sound sensors, and speakers configured for audio communication or providing audible alerts, such as Arlo Chime™ audible devices. The imaging devices or cameras 21, sensors 55, or other monitoring devices 12 also may be incorporated into form factors of other house or building accessories, such as doorbells, floodlights, etc., each which may be available on a stand-alone basis or as part of any of a number of systems available from Arlo Technologies, Inc. of Carlsbad, California.

Still referring to FIG. 1, the base station 14 may also be in communication with a server 58, which may be a cloud-server accessible via the WAN 50. The server 58 can include or be coupled to a microprocessor, a microcontroller or other programmable logic element (individually and collectively considered "a controller") configured to execute a program. Alternatively, interconnected aspects of the controller and the programs executed by it could be distributed in various permutations within the monitoring device 12, the base station 14, the user device 16, and the server 58. This program, while operating at the server level, may be utilized in filtering, processing, categorizing, storing, recalling and transmitting data received from the monitoring devices 12 via the base station 14. Server 58 may also be in communication with or include a computer vision (CV) program, also referred to as an image evaluation module, which can apply one or more filters or processes, such as edge detection, facial recognition, motion detection, etc., to detect one or more characteristics of the image or other recording such as, but not limited to, identifying or detection of a specific individual person(s) or a person(s) in general, an animal, vehicle, or package present in the image or recording. The CV program and further capabilities will further be described below.

In operation, each monitoring device 12 can be configured, through suitable mounting of the monitoring device 12 and/or through suitable manipulation of its controls, to monitor an area of interest, such as a part of a building or section of property or a monitored zone. In the case of imaging device 12a, the device 12a may capture an image automatically upon detection of a triggering event and/or upon receipt of a command from a user device 16. An image also may be captured automatically upon detection of a triggering event detected by a detector. Whether the monitoring device is an imaging device or some other device, the triggering event may be motion, and the detector may be a motion detector. Instead of or in addition to detecting motion, the detector could include an IR sensor detecting heat, such as the body heat of an animal or person. The triggering event also could be sound, in which case the detector may include the microphone 18. In this case, the triggering event may be a sound exceeding a designated decibel level or some other identifiable threshold. Upon receiving notification from a monitoring device 12 of a triggering event, the system 10 can generate an alert such as a push notification ("PN") and send it to one or more user devices 16 for indicating the triggering event. As explained in more detail below, the particular alert sent to the user device 16 will have characteristics that correspond to the type of stimulus or event that was detected.

In the case of the monitoring device being an image device 12a having a camera, whether camera operation is triggered by a command from a user device 16 or by detection of a triggering event, the camera 21 can then capture a raw video stream which, in turn, can be provided to the media encoder 30 for producing video packets in an encoded video stream. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream. Under control of the processor 32 executing the program, the encoded media stream can be transmitted from the wireless I/O communication device 36 to the base station 14. The monitoring device 12a also is provided by a user-accessible sync button 67 which, upon actuation, triggers an onboarding operation as described below.

The media stream may then be transmitted via the WAN 50 to a remote data storage device 59 in communication with a media server 58 for data storage and processing. The storage device 59 may be a cloud-based storage device, and the media server 58 may be a cloud server accessible via a wireless connection. A filtered or otherwise processed image can then be displayed on the user device 16, along with additional visual and/or audio messaging such as a text and/or audio message identifying a generic or particular person or object.

Figure 2:
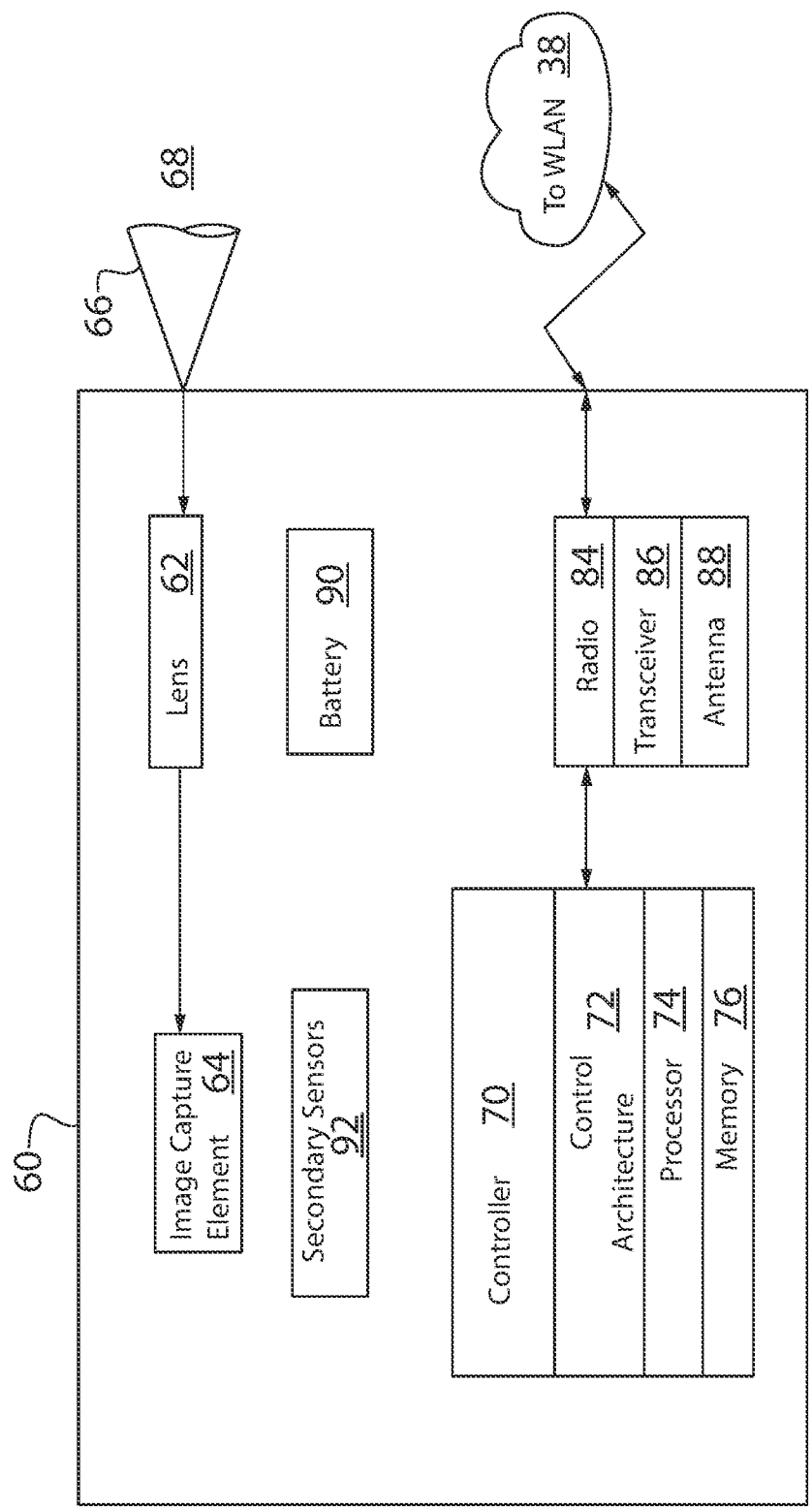
FIG. 2 is a block diagram representing a specific imaging device usable as a more generic imaging device shown in FIG. 1.

FIG. 2 represents a specific example of imaging device 12a shown in in the form of a smart camera. In the illustration, the smart camera 12a has a small and compact housing 60 for enclosing and protecting the various camera components illustrated as blocks in FIG. 2. The smart camera 12a includes a lens 62 and an imager device (or primary sensor) 64. The imager 64 can be any suitable type of image capturing device or sensor; including, for example, an area array sensor, a Charge Coupled Device (CCD) sensor, a Complementary Metal Oxide Semiconductor (CMOS) sensor, or a linear array sensor, just to name a few possibilities. The imager 64 may capture images in suitable wavelengths on the electromagnetic spectrum. The imager 64 may capture color images and/or grayscale images.

The smart camera 12a has a field of view 66 extending radially from the outwardly facing lens 62. The field of view 66 is a portion of the environment 68 within which the smart camera 12a can detect electromagnetic radiation via the lens 62 and imager 64. The smart camera 12a is configured to capture images. An image is a digital representation of a scene for the environment 68 as captured by the smart camera 12a. Capturing an image refers to the act of obtaining and recording an image data file or stream of the digital representation. The scene is the portion of the environment 68 observed through the field of view 66. Capturing a plurality of images in a timed sequence can result in a video. Capturing a video refers to the act of obtaining and recording a video data file or stream of the digital representation.

Still referring to FIG. 2, the smart camera 12a has a controller 70 including a control architecture 72 having a processor 74 and a memory 76. Of course, the controller could similarly have multiple processors, such as dual processors and accompanying memory. The processor 74 can include any component or group of components that are configured to execute, implement, and/or perform any of the processes or functions described herein or any form of instructions to carry out such processes or cause such processes to be performed. Examples of suitable processors include a microprocessor, microcontroller, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 74 can include a hardware circuit (e.g., an integrated circuit) configured to carry out instructions contained in program code.

The memory 76 stores one or more types of instructions and/or data. The memory 76 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 76 can be a component of a processor, can be operatively connected to a processor for use thereby, or a combination of both. The memory 76 can include various instructions stored thereon. For example, the memory 76 can store one or more modules. Modules can be or include computer-readable instructions that, when executed by a processor, cause a processor to perform the various functions disclosed herein. While functions may be described herein for purposes of brevity, it is noted that the functions are performed by the processor 74 using the instructions stored on or included in the various modules described herein. Some modules may be stored remotely and accessible by a processor using, for instance, various communication devices and protocols.

The smart camera 12a typically communicates wirelessly (e.g., with the base station 14) via an input/output device, such as a radio 84. An example of a radio includes a wireless local area network (WLAN) radio. With the WLAN radio 84, the smart camera 12a generally communicates over a short-range wireless communication network, such as the WLAN 38. In one implementation, the radio 84 includes a transceiver 86 for transmitting and receiving signals to and from the base station 14, via an antenna 88. The transceiver 86 can be separate from or part of the control architecture 72. The wireless communication can be as prescribed by the IEEE 802.11 standards in accordance with the Wi-Fi™ communication protocol. It is appreciated, however, that the smart camera 12a can be adapted to perform communications in accordance with other known or to be developed communication protocol, or even a proprietary communication protocol developed for a particular application. Also, while only a single transceiver 86 and single antenna 88 is shown, multiple transceivers and multiple antennas can be used to communicate at multiple communication frequency bands. Alternatively, the single transceiver 86 and the single radio 84 can communicate over multiple frequency bands.

The imaging devices 12a can further include one or more secondary sensors 92. For example, a secondary sensor 92 may be a microphone, a motion sensor, a temperature sensor, an image sensor, or a vibration sensor.

An exemplary camera capable of incorporating aspects of the invention is an Arlo Ultra™ camera available from Arlo Technologies in Carlsbad, Calif., US. Before moving to other components of the system 10, it should be understood by somebody skilled in the art that the imaging devices 12a includes many additional conventional components typically found in a wireless camera. Further discussion regarding these components is not provided herein since the components are conventional.

Figure 3:
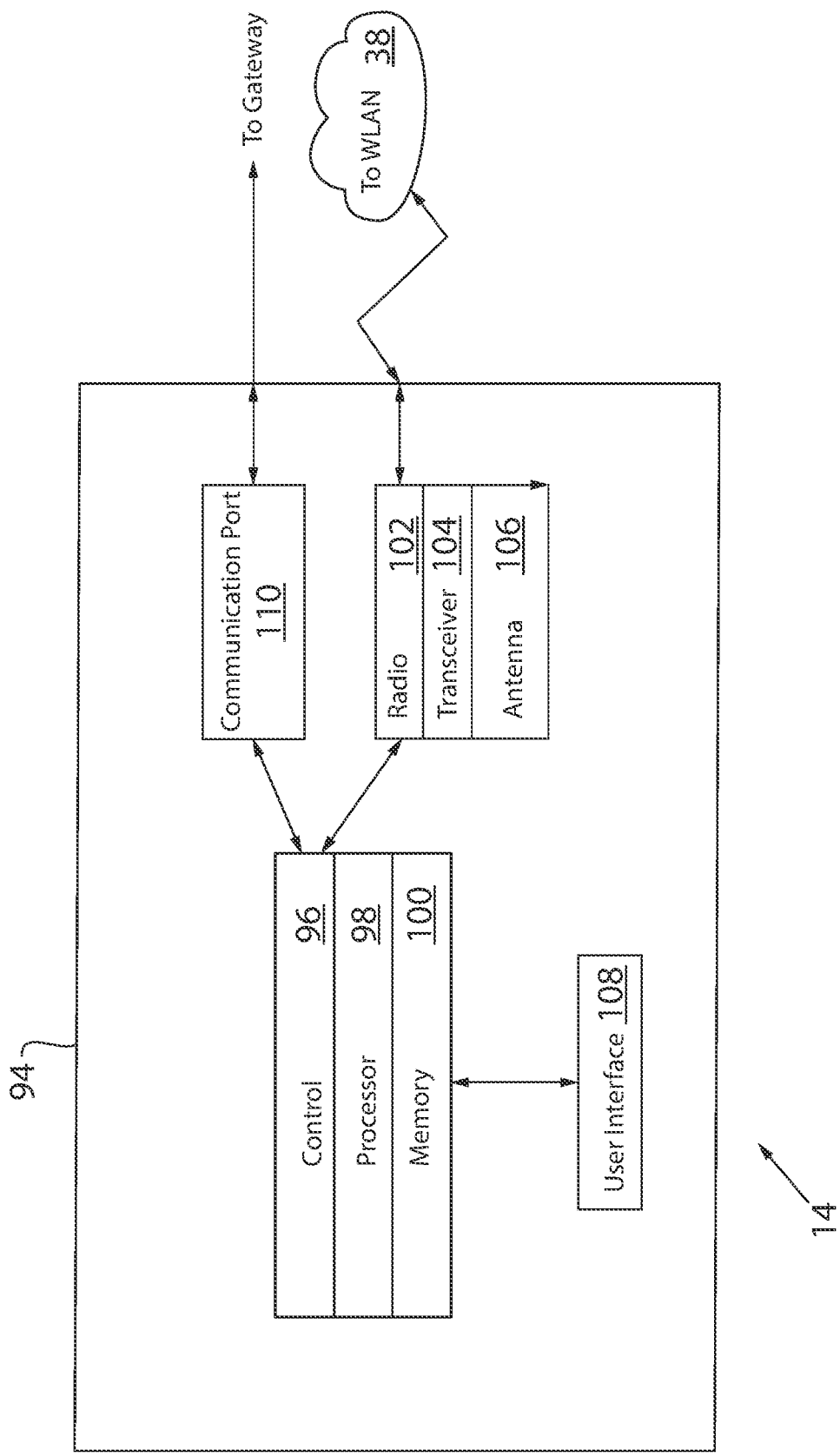
FIG. 3 is a block diagram representing specific base station usable as the more generic base station shown in FIG. 1.

Turning now to FIG. 3, the figure represents a specific example of the more generic base station 14 shown in FIG. 1. In the illustration, the base station 14 has a housing 94 for enclosing and protecting the various components illustrated as blocks in FIG. 3. The base station 14 has a controller 96, including a processor 98 and a memory 100. While the arrangement of FIG. 3 shows a single processor 98 and a single memory 100, it is envisioned that many other arrangements are possible. For example, multiple elements of the base station 14 can include a distinct processor and memory. The processor 98 can include a component or group of components that are configured to execute, implement, and/or perform any of the processes or functions described herein for the base station 14 or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 98 can include a hardware circuit (e.g., an integrated circuit) configured to carry out instructions contained in program code. In arrangements in which there are a plurality of processors, such processors can work independently from each other, or one or more processors can work in combination with each other.

Still referring to FIG. 3, the base station 14 includes a memory 100 for storing one or more types of instructions and/or data. The memory 100 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 100 can be a component of the processor 98, can be operatively connected to the processor 98 for use thereby, or a combination of both. The controller 96 can include various instructions stored thereon. For example, the controller 96 can store one or more modules. Modules can be or include computer-readable instructions that, when executed, cause the processor 98 to perform the various functions disclosed for the module. While functions may be described herein for purposes of brevity, it is noted that the functions are performed by the processor 98 or another portion of the controller using the instructions stored on or included in the various modules. Some modules may be stored remotely and accessible by the processor 98 or another portion of the controller using, for instance, various communication devices and protocols.

Still referring to FIG. 3, the base station 14 typically communicates wirelessly (e.g., with the imaging devices 12) via a radio 102. An example of a radio includes a wireless local area network (WLAN) radio. With the WLAN radio 102, the base station 14 generally communicates over a short-range wireless communication network, such as the WLAN 38. In one implementation, the radio 102 includes a transceiver 104 for transmitting and receiving signals to and from the base station 14, via an antenna 106. The transceiver 104 can be separate to or part of the controller 96. The wireless communication can be as prescribed by the IEEE 802.11 standards in accordance with the Wi-Fi™ communication protocol. It is appreciated, however, that the base station 14 can be adapted to perform communications in accordance with other known or to be developed communication protocol, or even a proprietary communication protocol developed for a particular application. Also, while only a single transceiver 104 and single antenna 106 is shown, multiple transceivers and multiple antennas can be used to communicate at multiple communication frequency bands. Alternatively, the single transceiver 104 and the single radio 102 can communicate over multiple frequency bands.

The base station 14 includes the user interface 108. The user interface 108 can include an input apparatus and an output apparatus. The input apparatus includes a device, component, system, element, or arrangement or groups thereof that enable information/data to be entered into the base station 14 from a user. The output apparatus includes any device, component, or arrangement or groups thereof that enable information/data to be presented to the user. The input apparatus and the output apparatus can be combined as a single apparatus, such as a touch screen commonly used by many electronic devices.

The base station 14 includes a communication port 110, which is configured to provide a communication interface between a larger computer network, such as the Internet via the gateway.

In one construction, since the base station 14 is powered by an enduring power source (e.g., power outlet), it is not necessary for the base station 14 to be operated in a default sleep mode, although this is not precluded. An exemplary base station capable of incorporating aspects of the invention is an Arlo SmartHub™ base station available from Arlo Technologies in Carlsbad, Calif., US. Before moving to the operation of the system 10, it should be well understood by somebody skilled in the art that the base station 14 includes many additional conventional components typically found in a base station or access point.

As briefly mentioned above, the CV program, or image evaluation module, stored in or accessible by the controller on the server 58 may be equipped with additional features to enhance operating capabilities of system 10. For purposes of discussion, the CV program will be discussed with respect to execution on the server 58. However, it is understood that controller may refer to the controller on the server 58, the controller 70 on the imaging device 12a, the controller 96 on the base station 14, or a combination thereof. Each controller includes memory configured to store instructions and a processor configured to execute the stored instructions. Modules may be stored in the memory for any of the devices and executed by the corresponding processor. The imaging device 12a is in communication with the base station 14, and the base station 14 is in communication with the server 58. Thus, a portion of the processing, which will be described with respect to the CV program, may be executed on any controller and the output of the processing communicated to another processor for another portion of the processing.

In order to on-board/integrate a monitoring device 12 having a camera, such as smart security camera 12a, into monitoring system 10, it is necessary to provide monitoring device 12a-12n with access credentials 158 for the access points to the various frequency bands of WLAN 38 broadcast by gateway router 54. More specifically, gateway router 54 is initialized so as to broadcast WLAN 38 on various frequency bands, each having its own unique network name 158a and corresponding password 158b. The connection point to each of these frequency bands is an access point. In addition, when initialized, gateway router 54 connects to WAN 50 so as to interact with server 58 and provides server 58 with data regarding access credentials 158 for the various frequency bands being broadcast. If a user utilizes a PC or laptop to interact with gateway router 54, the user may access the device through a user account set up on server 58 of cloud-based control service system 50. Alternatively, if the user utilizes a mobile device, such as a smart phone or tablet, an application may be provided thereon which allows the user access to their account.

Once logged in their account, a user can gain access to the network names 158a and corresponding passwords 158b for each of the access points to the various frequency bands of WLAN 38 broadcast by gateway router 54, either by direct communication with the gateway router 54 or through communication with server 58, FIG. 1. It is contemplated for the user to change network names 158a and corresponding passwords 158b to user-selected network names 158a and corresponding user-selected passwords 158b, if so desired by the user.

Figure 6:
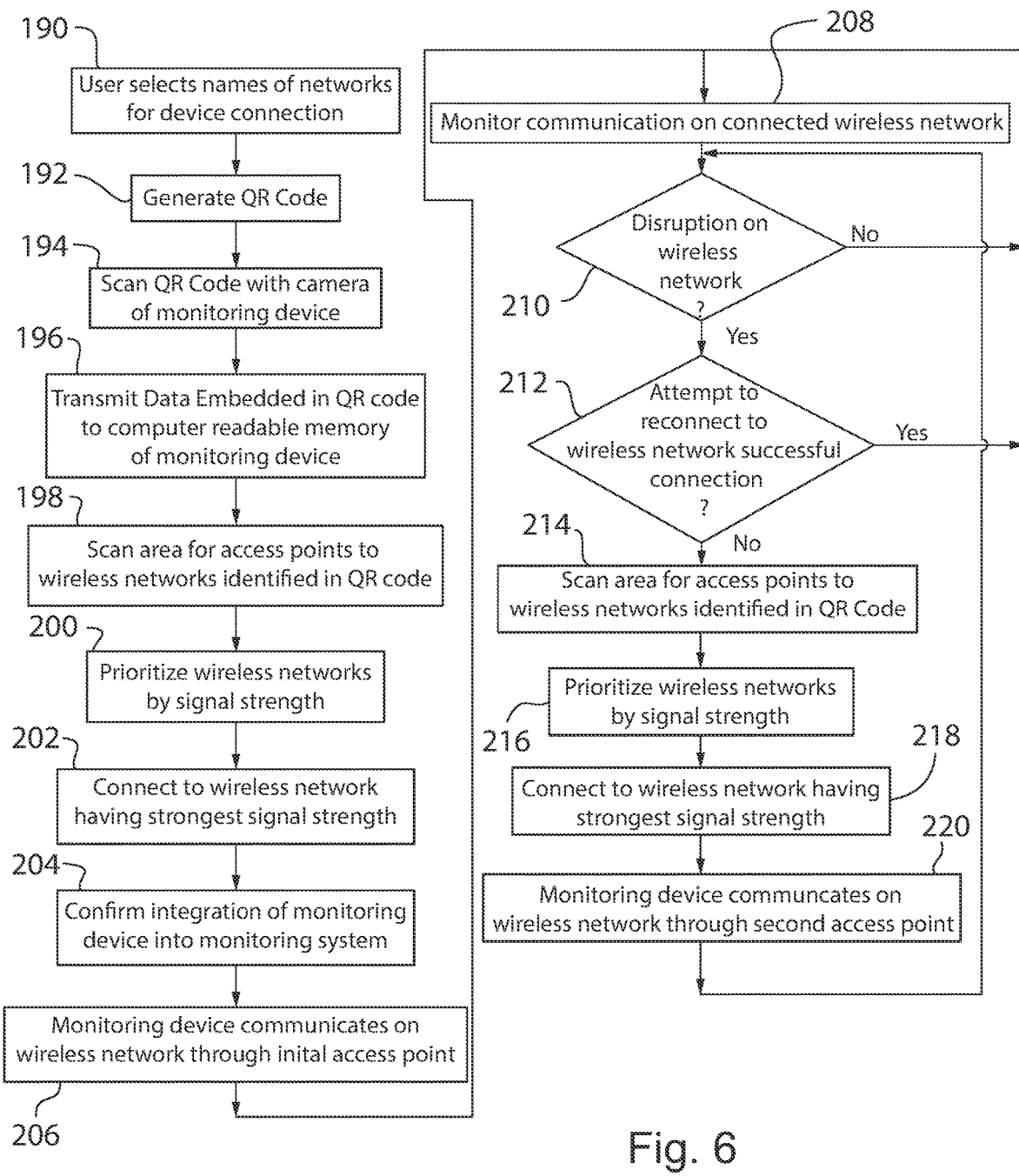
FIG. 6 is a flowchart showing an example of the methodology for integrating the monitoring device into the networked electronic monitoring system.

Referring now to FIG. 6, upon completion of the naming of the network names 158a and corresponding passwords 158b for each of the access points, a user may now select the access points (typically by selecting network names 158a) for connection to WLAN 38, block 190, FIG. 6. For example, a user may select the network name 158a for the access point to the 2.4 GHZ frequency band and the network name 158a for the access point to the 5 GHZ frequency band. The user may be prompted to add each access point sequentially or, alternatively, a user may select a plurality of access points provided in a list displayed on the display screen 142 of user device 16. In addition, a user may be prompted on user device 16 to select the type of monitoring device 12 to be added to monitoring system 10, e.g., smart security camera system 12a. It is contemplated for the user to select the type of monitoring device 12 to be added to monitoring system 10 through a drop-down menu displayed on user device 16 or by the user entering an identification code (e.g., a UPC code) corresponding to the type of monitoring device 12 to be added.

Figure 5:
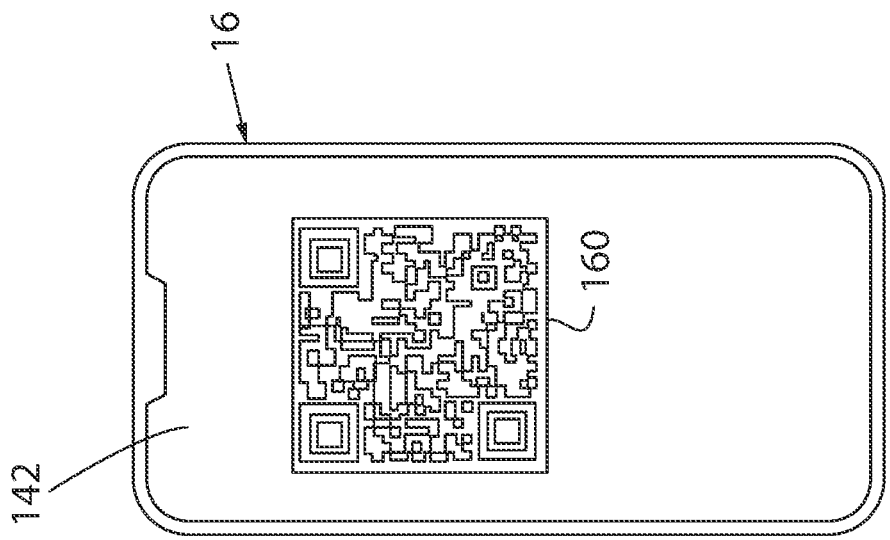
FIG. 5 is a schematic representation of the user device of FIG. 4 displaying a subsequent step for integrating the monitoring device into the networked electronic monitoring system.
Figure 4:
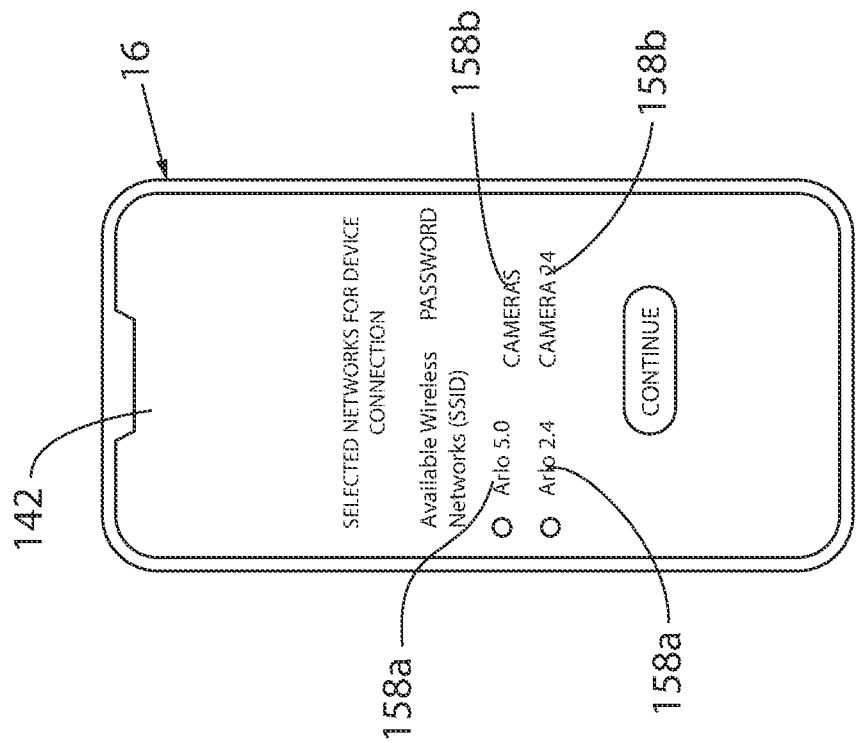
FIG. 4 is a schematic representation of a user device displaying an initial step for integrating the monitoring device into the networked electronic monitoring system of FIG. 1.

Once the type of monitoring device 12, in this case a smart camera 12a, is selected, the program or application on the user device 16 generates a machine/computer-readable code, such as a QR code, at block 192, FIG. 6. The code includes data corresponding to all access points and associated access credentials 158 (or in other words all of the network names 158a and corresponding passwords 158b selected by the user) embedded therein which are required for monitoring device 12a to connect to the various access points of WLAN 38. As is known, a QR code is comprised of black squares arranged in a square grid on a white background, which can be read by an imaging device such as a camera, processed, and appropriately interpreted to allow for the transfer of the data embedded in the code. The QR code 160 may be displayed on display 142 of user device 16 as shown in FIG. 5, or the QR code 160 may be printed out by a user.

After being powered up, monitoring device 12 must be placed in a connection mode to transfer data thereto. By way of example, a user may press and release sync button 67 on monitoring device 12a (FIG. 1) to cause monitoring device 12 to enter the connection mode wherein the data corresponding to all access points and associated access credentials 158 which are required for monitoring device 12a to connect to WLAN 38 may be transferred thereto. More specifically, with monitoring device 12a in its connection mode, a visual display, such as a blinking LED, is provided to indicate to the user that imaging device or image capture element 64 of monitoring device 12a is now configured to scan QR code 160, heretofore described. Imager 64 of monitoring device 12a is positioned within a set range of (e.g., approximately 8 inches) and directed at QR code 160 such that QR code 160 is within the field of view of imager 64 of monitoring device 12a. When imager 64 of monitoring device 12 reads QR code 160, monitoring device 12a and/or user device 16 may provide an audible signal informing the user that monitoring device 12a has read QR code 160 and received the data embedded in QR code 160, block 194, FIG. 6. If no audible signal is provided, the process may be repeated.

Once QR code 160 is scanned by imager 64 of monitoring device 12a, image signal processor 74 causes the data embedded in QR code 160 to be processed, appropriately interpreted, and transmitted to computer-readable memory 76 for future reference, block 196, FIG. 6. In addition, image signal processor 74 causes monitoring device 12 to scan the area for the various access points identified in the data received via QR code 160, block 198, FIG. 6, and prioritizes the located access points based on the strength of signals received by wireless I/O communication device 64, block 200, FIG. 6. Once the access points are prioritized, the system selects the access point having the strongest signal strength for connection to the network and causes primary wireless I/O communication device 64 of monitoring device 12a to connect to an initial access point having the strongest signal strength utilizing network name 158a and corresponding password 158b for the access point obtained via QR code 160. This allows allowing monitoring device 12 to send and receive data over WLAN 38, through monitoring system 10, and typically from WLAN 38 to WAN 50 for processing by server 58 (FIG. 1), block 202, FIG. 6. Once monitoring device 12 connects to WLAN 38, a serial number of and/or other information concerning the monitoring device 12a may be transmitted to server 58. Server 58 may provide confirmation of the successful integration of monitoring device 12a into monitoring system 10. For example, server 58 may causes the serial number of monitoring device 12a and the time zone in which monitoring device resides to be transmitted to user device 16 for display on display 142, block 204, FIG. 6.

As should be apparent from the above discussion of the controller, some or all of the functions performed by the server 58 could instead be performed, by in part or whole by circuitry stored in the base station 14 or other devices.

With monitoring device 12a integrated into monitoring system 10, data packets corresponding to sounds, images, captured frames, and/or video clips captured by the camera of monitoring device 12a may be transmitted by monitoring device 12 over WLAN 38 to the base station 14, to the server 58 over WAN 50, and/or to the one of more user devices 16, block 206, FIG. 6. Further, data packets from one of more user devices 16, server 58 or the various components of monitoring system 10 may be transmitted to monitoring device 12a over WLAN 38.

Referring again to FIG. 6, during operation, image signal processor 74 of monitoring device 12a monitors communications on WLAN 38, block 210, FIG. 6. If image signal processor 74 of monitoring device 12a senses no disruption in communication, monitoring device 12a remains in the default operational state and communications continue through the initial access point, block 206. If, at decision block 210, it is determined that there is a connectivity issue or communication(s) disruption, primary radio 84 of monitoring device 12a attempts to reconnect to WLAN 38 through the initial access point at block 212. At decision block 212, monitoring device 12 evaluates whether the reconnection attempt was successful. If the reconnection attempt is successful, monitoring device is restored to the default operational state at block 208, and system communications continue through the initial access point.

Still referring to FIG. 6, if it is determined at decision block 212 that the reconnection attempt has failed, image signal processor 74 of monitoring device 12a once again scans the area for the various access points identified in the data received via QR code 160, block 214, and prioritizes the remaining access points based on signal strength, block 216, and the access point having the strongest signal strength is identified. Once the access points are prioritized, image signal processor 74 of monitoring device 12 causes primary radio 84 of monitoring device 12a to connect to a second access point having the strongest signal strength detected, utilizing the access credentials 158 for the second access point obtained via QR code 160, thereby allowing monitoring device 121 to send and receive data over WLAN 38, through monitoring system 10, and typically from WLAN 38 to WAN 50 through the internet provider system for processing by server 58 (FIG. 1) at block 218. Thereafter, image signal processor 74 of monitoring device 12a monitors communications on WLAN 38 through second access point, block 220. If no connection is made through the second access point after a certain number of attempts or a certain amount of elapsed time for the attempts as dictated by, for example, a stored program on the monitoring device 12a and/or server 58, image signal processor 74 of monitoring device 12a may once again scans the area for the various access points identified in the data received via QR code 160 and repeat the connection process, block 212 as heretofore described.

Although the operations described above with reference to FIG. 6 are described in conjunction with the specific smart camera type of imaging device 12a shown in FIG. 2, it is to be understood that the same are comparable functions could be performed with the more generic monitoring device of FIG. 1 or any of a variety monitoring devices as well, so long as the monitoring device has the capability of reading a QR code or otherwise acquiring the required data.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

I claim:

1. A method for on-boarding/integrating a monitoring device into an electronic monitoring system, comprising:
    displaying a plurality of access points to a wireless network on a mobile device,
    each of the plurality of access points having a corresponding credential associated therewith;
    selecting some or all access points of the plurality of access points;
    generating a non-transitory computer-readable optical code including information for the selected access points and
    associated credentials on the mobile device, the non-transitory computer-readable optical code being readable by the monitoring device;
    reading the non-transitory computer-readable optical code with the monitoring device so as to copy the information for the selected access points and
    associated credentials from the mobile device to the monitoring device;
    identifying the selected access point having the greatest signal strength;
    connecting the monitoring device to the wireless network via the identified access point having the greatest signal strength and
    the credential associated with the identified access point; and
    upon failure of the connection between the monitoring device and
    the wireless network via the identified access point:
    identifying a second of the selected access points having the greatest signal strength of the remaining access points; and
    connecting the monitoring device to the wireless network via the identified second access point and
    the credential associated with the identified second access point.

2. The method of claim 1, further comprising storing the information for the selected access points and associated credentials in a computer-readable memory on the monitoring device.

3. The method of claim 1, wherein the monitoring device includes a camera, the camera being configured to scan the non-transitory computer-readable optical code.

4. The method of claim 3, wherein the wireless network includes a wireless local area network (WLAN) including a base station, and wherein the base station is configured to communicate with a wide area network including an external server.

5. The method of claim 1, further comprising displaying a plurality of access points to a wireless network on a user device, and displaying the non-transitory computer-readable optical code on the user device to be read by the monitoring device.

6. The method of claim 1, wherein the non-transitory computer-readable optical code is a QR code.

7. The method of claim 1, wherein the selecting comprises sequentially selecting a plurality of access points from the available access points.

8. The method of claim 1, wherein the selecting is performed via a user accessing a user device.

9. The method of claim 8, further comprising:
    displaying the selected access points to the wireless network on the user device; and
    displaying the non-transitory computer-readable optical code on the user device to be read by the monitoring device.

10. A method for on-boarding/integrating a monitoring device into an electronic monitoring system, the method comprising:
    displaying a list of a plurality of access points to a wireless network on a display of a user device comprising one of a PC, a smart phone, and
    a tablet; each of the plurality of access points having a corresponding credential associated therewith;
    using the user device, sequentially selecting a series of the access points from the list of access points;
    displaying a non-transitory computer-readable optical code including data corresponding to the selected series of access points and
    associated credentials on the display of the user device,
    the non-transitory computer-readable optical code being readable by the monitoring device;
    scanning the non-transitory computer-readable optical code with the monitoring device;
    storing the data for the selected series of access points and associated credentials in a non-transitory computer-readable memory on the monitoring device;
    prioritizing the selected series of access points saved in the non-transitory computer-readable memory by signal strength;
    identifying an access point of the selected series of access points having the greatest signal strength as an initial access point;
    connecting the monitoring device to the wireless network via the initial access point and the credential associated therewith; and
    upon failure of the connection between the monitoring device and
    the wireless network via the initial access point:
    identifying a second access point of the selected series of access points having the greatest signal strength aside from the initial access point; and
    connecting the monitoring device to the wireless network via the second access point and the credential associated therewith.

11. The method of claim 10, wherein the monitoring device includes a camera, the camera configured to scan the non-transitory computer-readable optical code.

12. The method of claim 10, wherein the non-transitory computer-readable optical code is a QR code.

* * * * *